(12) United States Patent
Yezerets et al.

(10) Patent No.: US 7,628,063 B2
(45) Date of Patent: Dec. 8, 2009

(54) METHOD FOR ON-BOARD DIAGNOSTICS OF DIESEL ENGINE NOX ADSORBER CATALYSTS

(75) Inventors: Aleksey Yezerets, Columbus, IN (US); Sriram S. Popuri, Greenwood, IN (US); Neal W. Currier, Columbus, IN (US); William Shelbourne Epling, Waterloo (CA); Paul James Millington, Reading (GB); David Scott Lafyatis, Schaumburg, IL (US)

(73) Assignee: Cummins Inc., Columbus, IN (US)

( * ) Notice: Subject to any disclaimer, the term of this patent is extended or adjusted under 35 U.S.C. 154(b) by 135 days.

(21) Appl. No.: 12/008,323

(22) Filed: Jan. 10, 2008

(65) Prior Publication Data

US 2008/0168824 A1     Jul. 17, 2008

Related U.S. Application Data

(60) Provisional application No. 60/879,848, filed on Jan. 11, 2007.

(51) Int. Cl.
*G01M 15/10* (2006.01)
(52) U.S. Cl. .................................. 73/114.75
(58) Field of Classification Search .............. 73/114.69, 73/114.71, 114.72, 114.73, 114.75, 114.76
See application file for complete search history.

(56) References Cited

U.S. PATENT DOCUMENTS

| | | | |
|---|---|---|---|
| 5,732,551 A | 3/1998 | Naber et al. | |
| 5,956,945 A | 9/1999 | Kumar et al. | |
| 5,996,337 A | 12/1999 | Blosser et al. | |
| 6,009,742 A | 1/2000 | Balko | |
| 6,026,639 A | 2/2000 | Kumar | |
| 6,293,093 B1 | 9/2001 | Goralski et al. | |
| 6,301,881 B1 | 10/2001 | Kumar | |
| 6,497,092 B1 | 12/2002 | Theis | |
| 6,619,108 B2 * | 9/2003 | Birkhofer et al. | 73/114.75 |

(Continued)

OTHER PUBLICATIONS

Wm. B. Clemmens, Michael A. Sabourin and Thomas Rao, Detection of Catalyst Performance Loss Using On-Board Diagnostics, SAE Technical Paper Series, 900062.
John W. Koupal, Michael A. Sabourin and Wm. B. Clemmens, Detection of Catalyst Failure On-Vehicle Using the Dual Oxygen Sensor Method, SAE Technical Paper Series, 910561.

*Primary Examiner*—Eric S McCall
(74) *Attorney, Agent, or Firm*—Krieg DeVault LLP; J. Bruce Schelkopf, Esq.

(57) ABSTRACT

An OBD system that diagnoses on board the condition of NOx adsorber catalysts in diesel engines and that relies on existing mass-produced exhaust gas oxygen sensor, also known as lambda sensor, technology, and the following established phenomena. In a reducing environment, typical exhaust gas oxygen (lambda) sensors have different sensitivities to various reductants, with sensitivity decreasing in this order: $H_2$>CO>short-chain hydrocarbons>long-chain hydrocarbons. In the process of regeneration of the NOx adsorber catalyst, the original reductant may evolve into a different reductant species, e.g., via reactions such as a water-gas shift (WGS), a reforming, a partial oxidation, etc. This leads to a difference in exhaust gas oxygen sensor readings between the inlet to the catalyst and outlet from the catalyst. It has been observed in diesel engine testing that the ability of the NOx adsorber catalyst to perform such a reductant evolution is correlative to the catalyst's NOx reduction capability.

2 Claims, 5 Drawing Sheets

U.S. PATENT DOCUMENTS

| | | |
|---|---|---|
| 6,651,422 B1 | 11/2003 | LeGare |
| 6,673,619 B2 | 1/2004 | Sawada |
| 6,803,236 B2 | 10/2004 | Bailey et al. |
| 2001/0002550 A1* | 6/2001 | Zhang et al. ............... 73/118.1 |

* cited by examiner

METHOD FOR ON-BOARD DIAGNOSTICS OF DIESEL ENGINE NOX ADSORBER CATALYSTS This application claims priority benefit of U.S. Provisional Patent Application Ser. No. 60/879,848, filed Jan. 11, 2007.

BACKGROUND OF THE INVENTION

New US Environmental Protection Agency (EPA) regulations that go into effect in 2007 and 2010 will require that the performance of diesel engine after-treatment systems be monitored by on-board diagnostics (OBD) systems, and that the OBD systems be capable of detecting malfunctions in or failures of the after-treatment systems. Direct on-board measurements of a diesel engine's NOx reduction efficiency are presently not technically or commercially viable, because existing NOx sensors have inadequate sensitivity and durability, and because they are expensive. Thus, at present, no robust OBD strategy for diesel engine NOx adsorber catalysts is available to meet the new EPA regulations.

SUMMARY OF THE INVENTION

The present invention provides an OBD system that diagnoses on board the condition of NOx adsorber catalysts in diesel engines and that relies on existing mass-produced exhaust gas oxygen sensor, also known as lambda sensor, technology, and the following established phenomena. First, in a reducing environment, typical exhaust gas oxygen (lambda) sensors have different sensitivities to various reductants, with sensitivity decreasing in this order: $H_2$>CO>short-chain hydrocarbons>long-chain hydrocarbons. Second, in the process of regeneration of the NOx adsorber catalyst, the original reductant may evolve into a different reductant species, e.g., via reactions such as a water-gas shift (WGS), a reforming, a partial oxidation, etc. This leads to a difference in exhaust gas oxygen sensor readings between the inlet to the catalyst and outlet from the catalyst. Third, it has been observed in diesel engine testing completed to date that the ability of the NOx adsorber catalyst to perform such a reductant evolution is correlative to the catalyst's NOx reduction capability.

The use of a dual oxygen sensor system has been disclosed in the prior art. See SAE Technical Paper Series No. 900062, Clemmens, et al., "Detection of Catalyst Performance Loss Using On-Board Diagnostics," presented at the International Congress and Exposition, Detroit, Mich.; Feb. 26-Mar. 2, 1990 [hereinafter SAE-900062]; and SAE Technical Paper Series No. 910561, Koupal, et al., "Detection of Catalyst Failure On-Vehicle Using the Dual Oxygen Sensor Method," presented at the International Congress and Exposition, Detroit, Mich., Feb. 25-Mar. 1, 1991 [hereinafter SAE-910561]. SAE-900062 and SAE-910561 both discuss a method of determining the oxygen storage capacity (OSC) of a catalyst by comparing the signals from two oxygen (lambda) sensors during a transition of exhaust conditions from net lean to net rich. Our invention entails measuring the ability of the catalyst to convert the incoming reductant species to hydrogen. We refer to this process as watergas shift, although it actually is a complex series of catalytic processes. Therefore, we do not believe these papers constitute prior art with respect to our invention.

The method of measuring catalyst condition described by both SAE 900062 and 910561 essentially involves measuring how much oxygen, or oxidizing capability is consumed as the exhaust gas passes through the catalyst. In principle, they accomplish this by measuring the oxidizing/reducing power of the exhaust gas before and after catalyst. The difference (SAE-910561) or the rate of change of the difference (SAE-900062) is used to assess the condition of the catalyst. The larger the integrated difference, the greater the oxygen storage capacity of the catalyst, the better condition the catalyst is in. However, in both cases the authors describe a difference arising from the OSC of the catalyst. That OSC is the ability of the catalyst to consume reducing species, e.g. hydrocarbon, carbon monoxide, and hydrogen. This is the essence of the methods described in the two papers.

One key feature of both methods described by SAE-9.00062 and SAE-910561 is the use of the oxygen sensors to measure the amount of oxygen/reductant present in the exhaust gas. In fact, SAE-900062 clearly links the sensor output to the oxygen content of the gas: "the change in free oxygen concentration . . . detected by comparing the voltage response patterns between the pre- and post-catalyst oxygen sensors." We can see from this that the authors' intent was to accurately measure the oxidizing/reducing power of the exhaust gas. In contrast, our invention intentionally exploits the non-ideal behavior of the oxygen sensors to measure changes in the exhaust gas, other than oxidizing/reducing capacity of the exhaust gas, across the catalyst.

Commercial oxygen sensors measure net amount of oxygen in exhaust gas. Since exhaust gases may be a mixture of reductants with residual oxygen as the products of incomplete combustion, the oxygen sensor chemically combines the remaining oxygen and reductant and then measures either the amount of remaining oxygen or the amount of oxygen required to consume the remaining reductant. Thus, it produces a measure of "oxygen," positive when there is excess oxygen and negative when there is excess reductant. These values are often converted to another scale called lambda, which yields numbers greater than one for excess oxygen conditions and less than one for excess reductant conditions. Such a sensor should give us an accurate measure of the net oxidizing/reducing capacity of the exhaust gas. However, the oxygen sensor is a physical device, and due to its geometric characteristics has certain non-ideal behaviors.

In short, these non-ideal behaviors result in a different response of the sensor in the presence of different reducing gases. Two exhaust gas compositions with the same net lambda can cause different responses from the sensor. For example, when hydrogen is the reductant, the sensor is will read a lower lambda than when large hydrocarbons are the reductant. Our invention exploits this non-ideal behavior.

In the situation imagined in our invention, the final level of lambda in the exhaust gas at the catalyst outlet, after the consumption of all the OSC, will be different than that at the inlet. That difference is the basis of our invention, and it represents the extent to which the catalyst has interacted with the reductant compounds in the exhaust and converted them from one constituent to another. For example, if long chain hydrocarbons are converted to carbon monoxide or hydrogen the catalyst outlet sensor will indicate a lower lambda than the inlet sensor despite the fact the lambda in both cases is identical. This difference indicates the level of catalyst function.

There are two clear differences between our invention and the methods of SAE-900062 and SAE-910561.

1) SAE-900062 and SAE-910561 describe the measurement of the dynamic change of the "oxygen" signal at catalyst-in and catalyst-out around a lean/rich or rich/lean exhaust transition, while we are comparing the steady state levels of "oxygen" at catalyst-in and catalyst-out in either lean or rich conditions.

2) SAE-900062 and SAE-910561 want the oxygen sensors to measure the "oxygen" level while we employ the idiosyncrasies of the sensor to obtain information about the changes in the chemical nature of the reductant species.

BRIEF DESCRIPTION OF THE DRAWING FIGURES

DETAILED DESCRIPTION OF PREFERRED EMBODIMENTS

The present invention is a method of on-board diagnostics (OBD) of the NOx adsorber catalysts (NAC), which are also commonly referred to as NOx traps, or Lean NOx Traps (LNT), or NOx Storage-Reduction (NSR) catalysts, using mass-produced oxygen (lambda) sensors that are located upstream and downstream of a NAC (or just down-stream, with the up-stream oxygen (lambda) sensor value calculated based on the engine conditions, etc.). The method of the present invention is based on a combination of several specific properties of both the NAC and the lambda sensors, as will be described below.

A. Different Sensitivities of Lambda Sensors to Various Reductants

Figure 1:
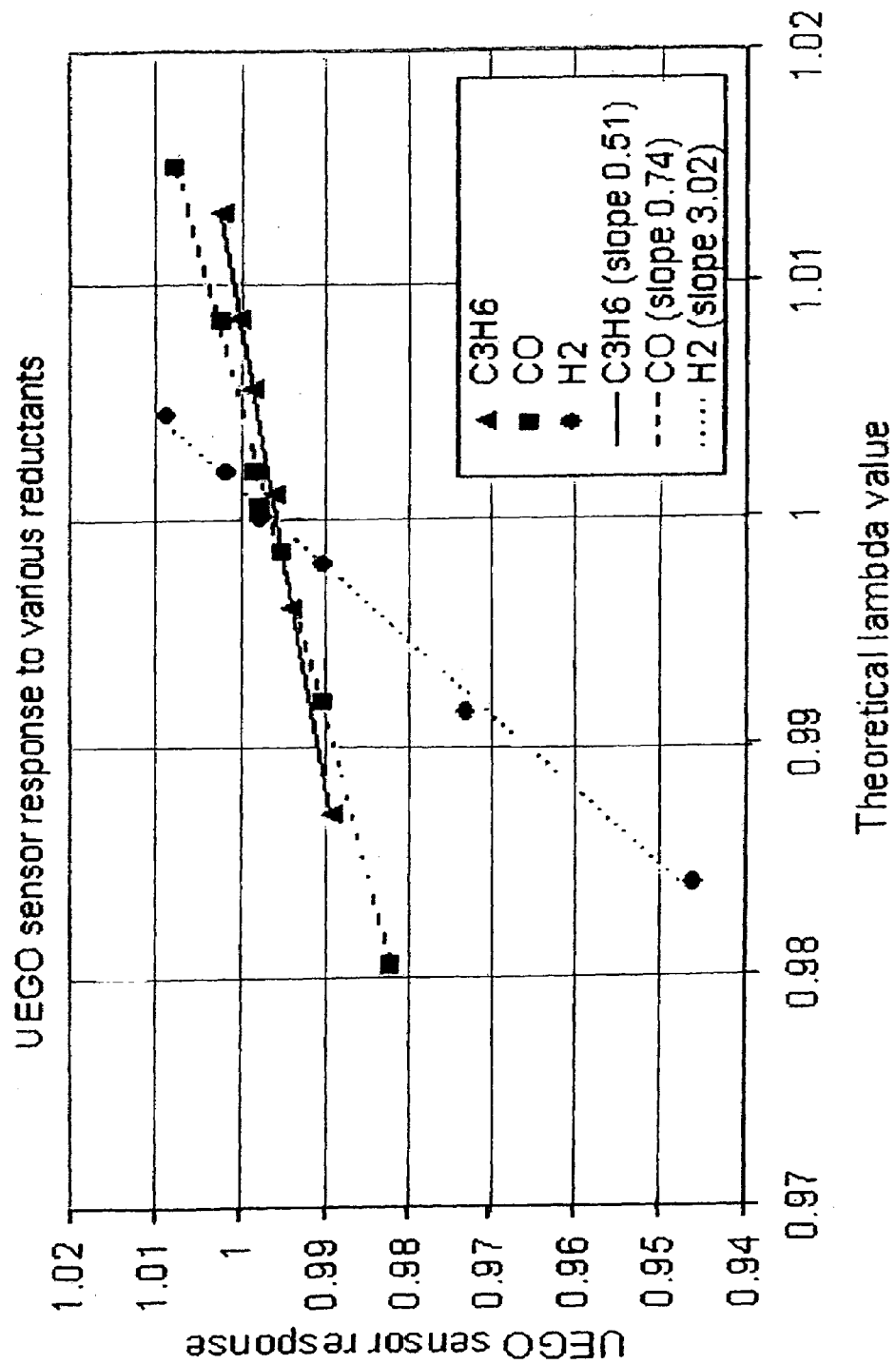
FIG. 1 is chart illustrating the different sensitivities of universal exhaust gas oxygen (UEGO) sensors (lambda sensors) to various reductants.

As shown in FIG. 1, known lambda sensors have different calibrations for different reductant species (H2, CO and $C_3H_6$). Thus, at any given lambda value, the sensor produces different signals depending on what reductant species are present.

It should be recognized that this is not an intended function of lambda sensors. Lambda sensors are intended to be key sensors in the engine fuel control feedback loop. The fuel control computer uses lambda sensor input to balance the fuel mixture, by leaning the fuel mixture when the lambda sensor reads rich and enriching the fuel mixture when the lambda sensor reads lean.

Rather, the reference to the lambda sensor's production of different signals depending on what reductant species are present is a well-known artifact affecting their target application. Nevertheless, this feature was found to be very useful in the present invention for OBD purposes.

B. Ability of the NAC to Chemically Modify the Reductant Species

The NAC traps NOx during the typical lean exhaust conditions (lambda>1), and is periodically regenerated by excursions to rich conditions (lambda<1). The net rich conditions in the exhaust gas are created by introducing a reductant, or a mixture of reductants, into the engine exhaust gas via engine management strategies, exhaust gas injection, or a combination of these two.

Under the net rich conditions, the NAC can chemically modify the reductants via several reactions, such as, for example:

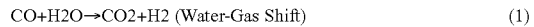

CO+H2O→CO2+H2 (Water-Gas Shift)　　(1)

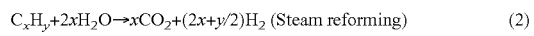

$C_xH_y$+2$x$H$_2$O→$x$CO$_2$+(2$x$+$y$/2)H$_2$ (Steam reforming)　　(2)

$C_xH_y$+½$x$O$_2$→$x$CO+$y$/2H$_2$ (Partial oxidation)　　(3)

$C_xH_y$→$n$C$_a$H$_b$ (Evolution of smaller HC molecules)　　(4)

All reactions of this type lead to the evolution of different reductant species, without changing the net lambda value.

Figure 2:
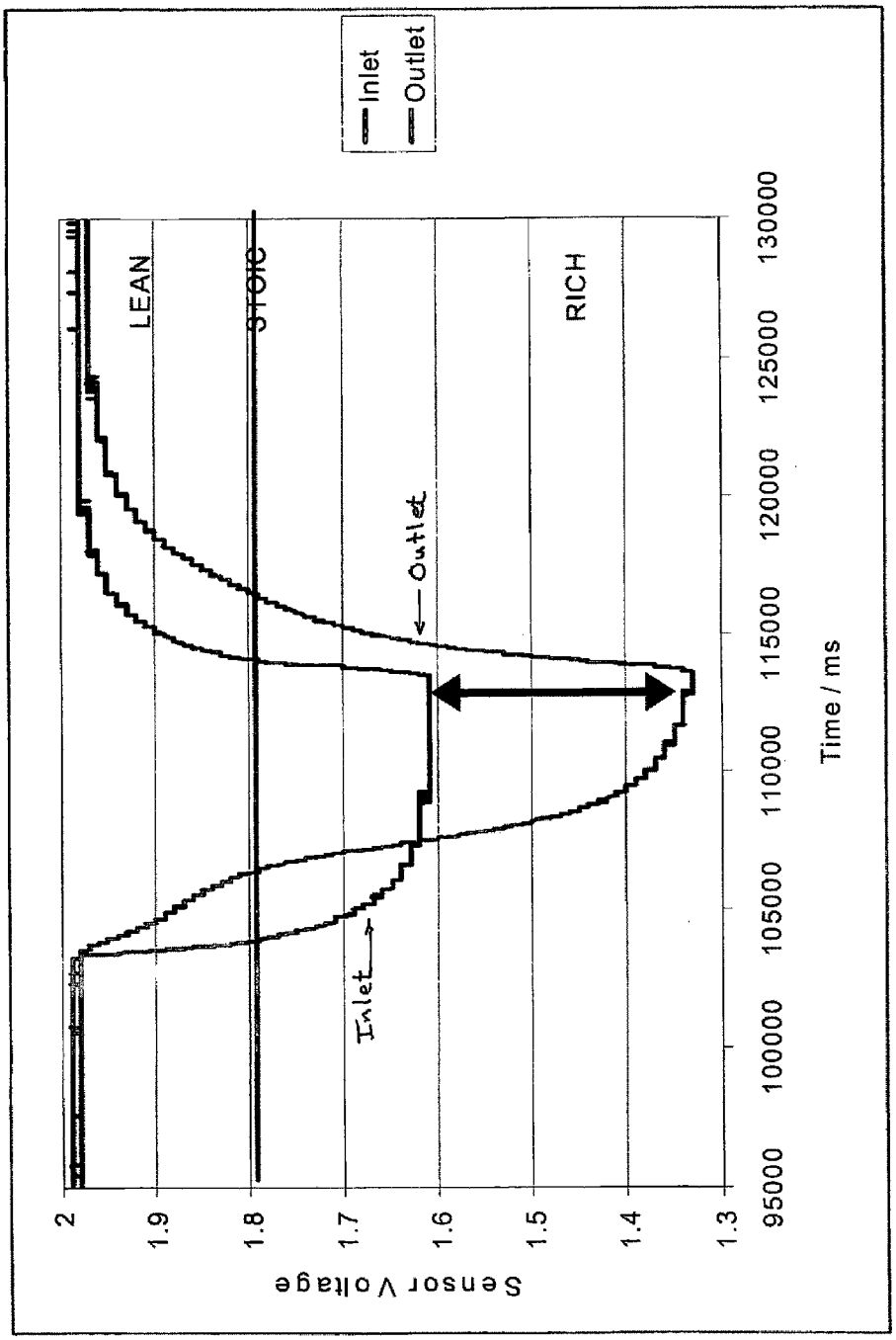
FIG. 2 is a chart illustrating lambda sensor signals during a pilot reactor regeneration of a NOx adsorber catalyst using CO as a reductant.

For example, the water-gas shift reaction (1) generates H2 by converting CO without changing lambda. As a result, due to a very different sensitivity of the lambda sensors to H2 and CO under the rich conditions (as shown in FIG. 1), the NAC outlet lambda sensor gives lower lambda readings than the NAC inlet lambda sensor. This effect is shown in FIG. 2, based on the reactor data.

Figure 3:
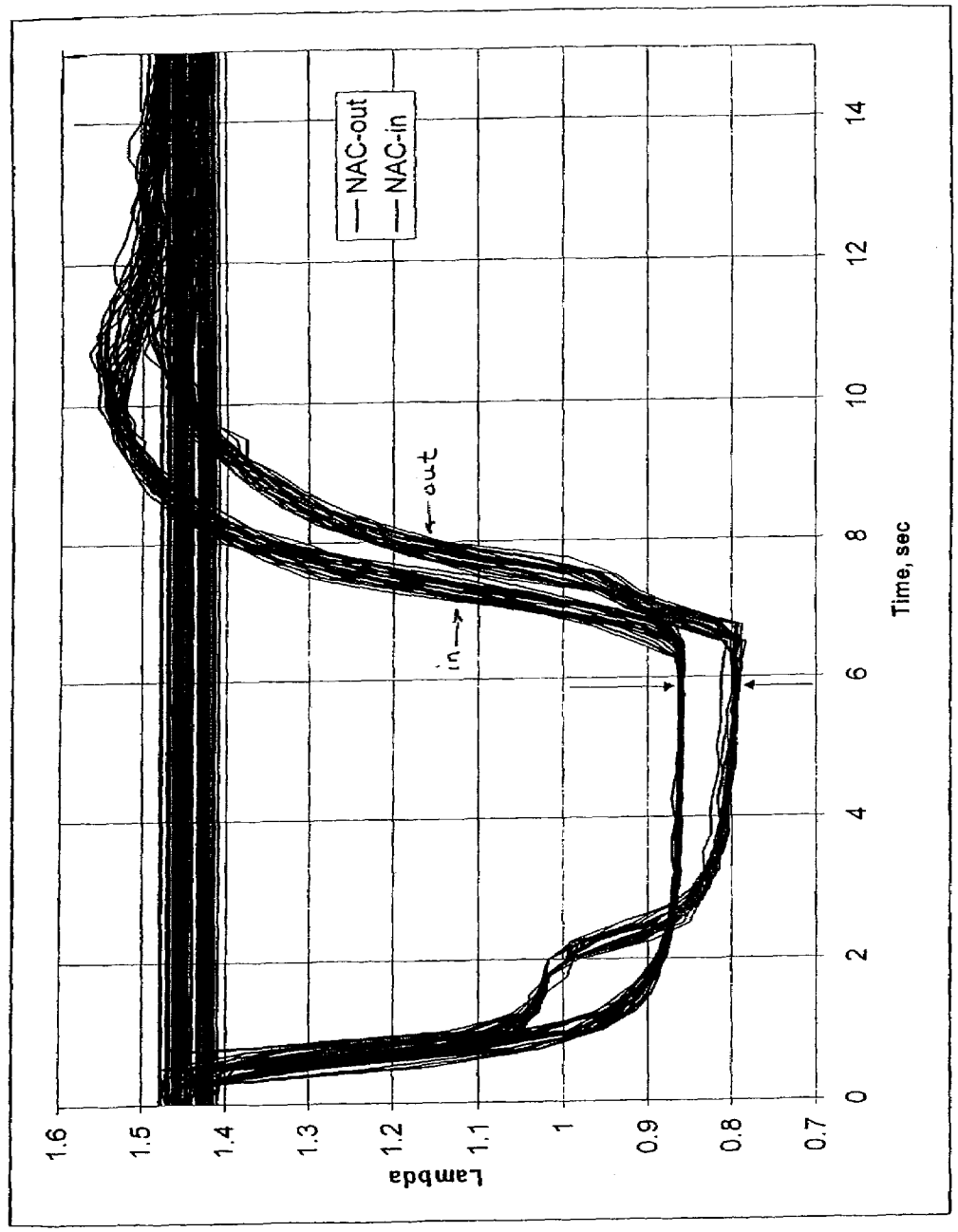
FIG. 3 is a chart illustrating lambda sensor readings during an engine test across a de-greened NOx adsorber catalyst.

Similar results were observed in the on-engine testing as shown in FIG. 3. The data in FIG. 3 represent the last 15 cycles of a steady-state test, which included a total of 20 NOx cycles at ~410±10° C. The repeating cycles were plotted on top of each other in order to illustrate the consistency of the observed effects.

Figure 4:
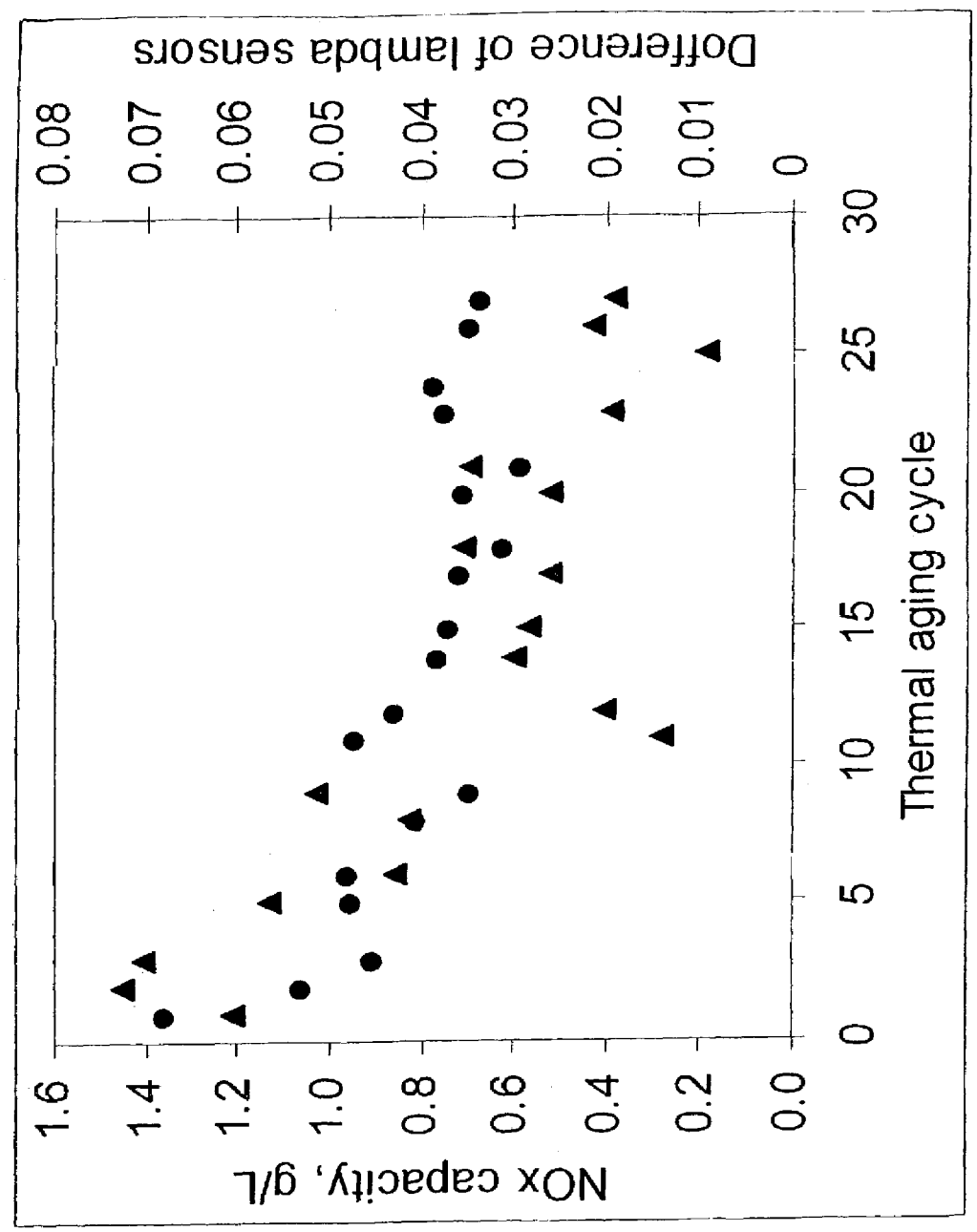
FIG. 4 is a chart illustrating the results of thermal aging of a NOx adsorber catalyst.
Figure 5:
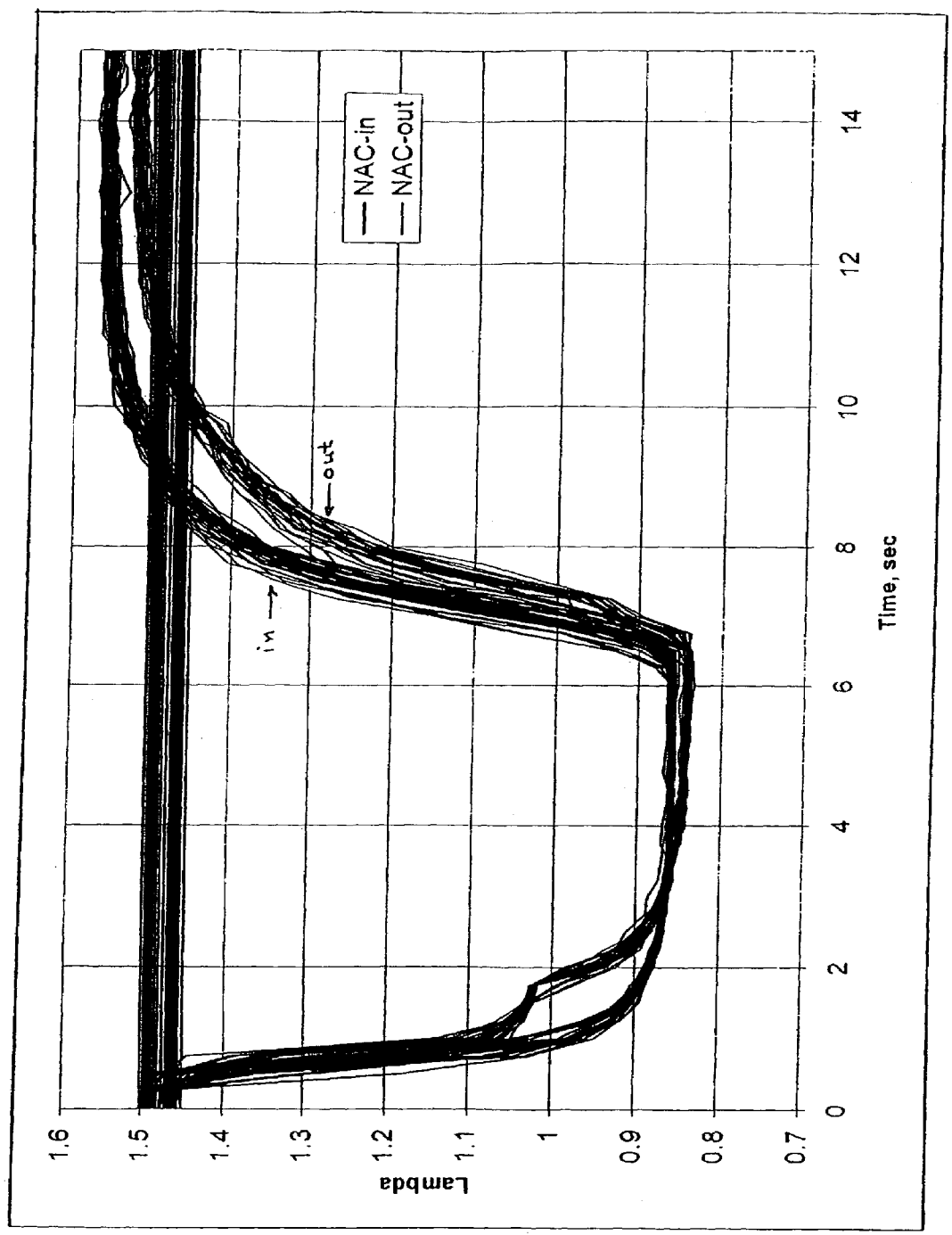
FIG. 5 is a chart illustrating lambda sensor reading across a NOx adsorber catalyst after 27 high-temperature cycles.

C. Correlation Between the NAC Performance and its Ability to Shift the Reductants It was established that the ability of the NAC to "shift" the reductants can be correlated to the NAC's target function: NOx adsorption. In an accelerated on-engine thermal degradation test, the NAC was exposed to 27 high-temperature cycles, leading to its progressive degradation, as illustrated in FIG. 4 (circles). Triangles in FIG. 4 represent the difference between the inlet lambda sensor and the outlet lambda sensor at different stages of thermal aging. As one can see, at the end of thermal aging, the effect due to the reductant "shift" has essentially disappeared, as illustrated in FIG. 5 (compare to FIG. 3).

In a separate sulfur-aging study, it was found that up to an unrealistically high level of sulfation, there is no correlation between the differences of the two sensors' readings during the rich period, as shown in FIG. 7. Thus, the discovered effect is primarily sensitive to the permanent damage, such as thermal damage, but quite insensitive to the recoverable damage, such as sulfation, which is desirable for OBD.

To summarize, under the appropriate conditions, we have discovered that the difference between the NAC inlet lambda sensor and outlet lambda sensor during a rich period, which reflects the ability of the catalyst to "shift" the reductants, can be correlated to its targeted NOx adsorption performance for the purposes of OBD.

We claim:

1. A method for on-board diagnostics of diesel engine NOx adsorber catalysts that trap NOx in exhaust gases during the typical lean exhaust gas condition and that are periodically regenerated by enriching the exhaust gas by introducing one or more reductants into the exhaust gas, comprising the steps of
   a. providing a first lambda sensor in the exhaust gas upstream of the NOx adsorber catalyst and a second lambda sensor in the exhaust gas downstream of the NOx adsorber catalyst, and
   b. correlating on-board a difference in the signal outputs from the first and second lambda sensors when the NOx adsorber catalyst is being regenerated by enriching the exhaust gas with one or more reductants with the diagnostic conclusion that the NOx adsorber catalyst remains operable to remove NOx from the exhaust gas in the lean exhaust gas condition; and correlating on-board a lack of difference in the signal outputs from the first and second lambda sensors when the NOx adsorber catalyst is being regenerated by enriching the exhaust gas with one or more reductants with the diagnostic conclusion that the NOx adsorber catalyst has become inoperable to remove NOx from the exhaust gas in the lean exhaust gas condition.

2. A method for on-board diagnostics of diesel engine NOx adsorber catalysts that trap NOx in exhaust gases during the typical lean exhaust gas condition and that are periodically regenerated by enriching the exhaust gas by introducing one or more reductants into the exhaust gas, comprising the steps of a. providing a lambda sensor in the exhaust gas downstream of the NOx adsorber catalyst, and b. correlating on-board a change in the signal output from the lambda sensor being generated during the lean exhaust gas condition when the NOx adsorber catalyst is being regenerated by enriching the exhaust gas with one or more reductants, with the diagnostic conclusion that the NOx adsorber catalyst remains operable to remove NOx from the exhaust gas in the lean exhaust gas condition; and correlating on-board a lack of difference in the signal output from the lambda sensor when the NOx adsorber catalyst is being regenerated by enriching the exhaust gas with one or more reductants, with the diagnostic conclusion that the NOx adsorber catalyst has become inoperable to remove NOx from the exhaust gas in the lean exhaust gas condition.

* * * * *